Sept. 13, 1927.
G. E. GOODING
1,642,067
BOX COVERING MACHINE
Filed Oct. 1, 1923
2 Sheets-Sheet 1
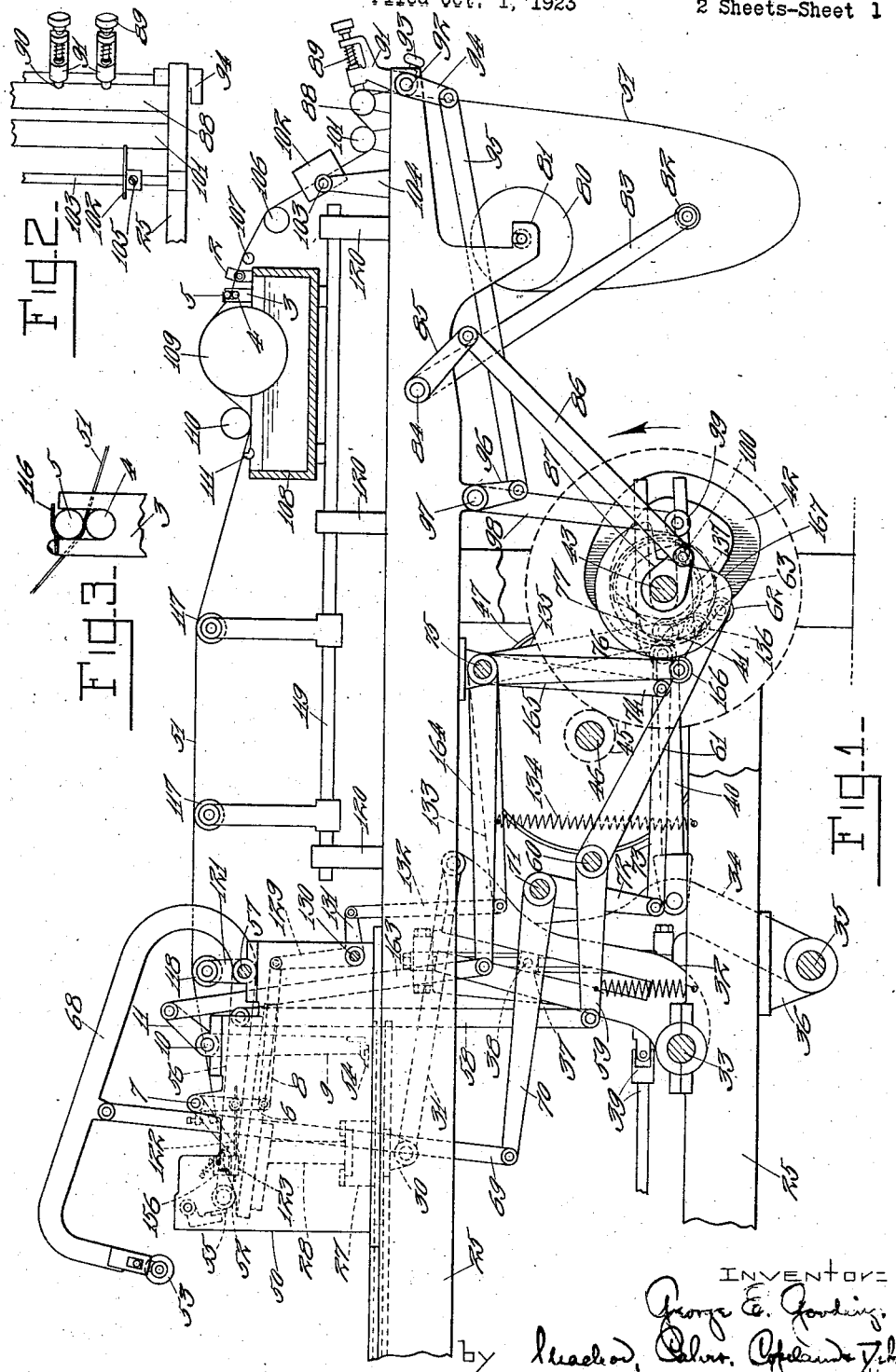
INVENTOR:
George E. Gooding.
by
Attys Sept. 13, 1927.

G. E. GOODING

BOX COVERING MACHINE

Filed Oct. 1, 1923

INVENTOR:
George E. Gooding,
by Macleod, Calver, Copeland & Dike.
Attys.

Patented Sept. 13, 1927.

1,642,067

UNITED STATES PATENT OFFICE.

GEORGE EDWARD GOODING, OF BOSTON, MASSACHUSETTS, ASSIGNOR TO JOHN T. ROBINSON COMPANY, OF BOSTON, MASSACHUSETTS, A CORPORATION OF MASSACHUSETTS.

BOX-COVERING MACHINE.

Application filed October 1, 1923. Serial No. 665,790.

This invention relates to machines of the general type disclosed and claimed in Letters Patent No. 1,289,729, issued December 31, 1918, to Harrison S. Gipe. The machine shown in said patent is designed for the purpose of applying paper or other covering material to the tops and bottoms of boxes whose sides and ends have previously been provided with a covering of similar material. Said machine comprises a work support on which the box is placed with the portion to be covered uppermost, said work support being mounted on a reciprocating carriage which is moved inwardly and outwardly past the devices for applying the covering material, the arrangement being such that when the carriage is in its innermost position the end of a web of covering material, suitably coated with adhesive, is applied to the outer edge of the box, and as the carriage moves outward said covering material is drawn from the supply and pressed down upon the box, the portion applied to the latter being subsequently severed from the web.

The present invention has for its object to provide in a machine of this type, improved mechanism for handling the web of covering material and for feeding, controlling, guiding, supporting, holding, and severing the same.

The foregoing and other objects of the invention, together with means whereby the same may be carried into effect, will best be understood from the following description of one form or embodiment thereof illustrated in the accompanying drawings, in which:

Fig. 1 is a simplified side elevation of the machine with certain parts, not essential to the invention claimed, omitted.

Fig. 2 is a plan view of a portion of the rear end of the machine.

Fig. 3 is an enlarged detail side elevation of the tension device associated with the adhesive fountain.

Figure 5:
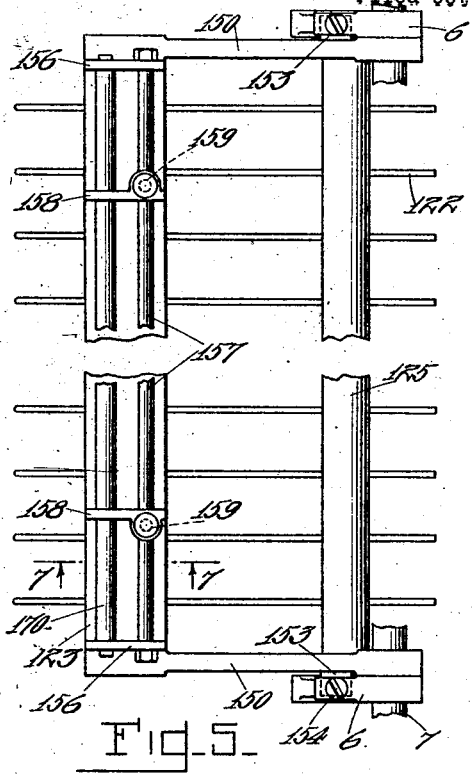
Fig. 5 is a plan view of the mechanism for handling the web adjacent its point of application to the box.
Figure 7:
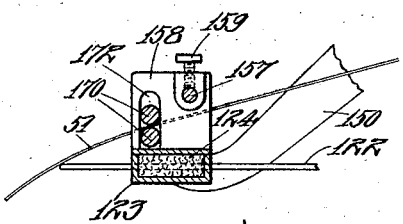
Fig. 7 is a detail section taken substantially on the line 7—7, Fig. 5.
Figure 4:
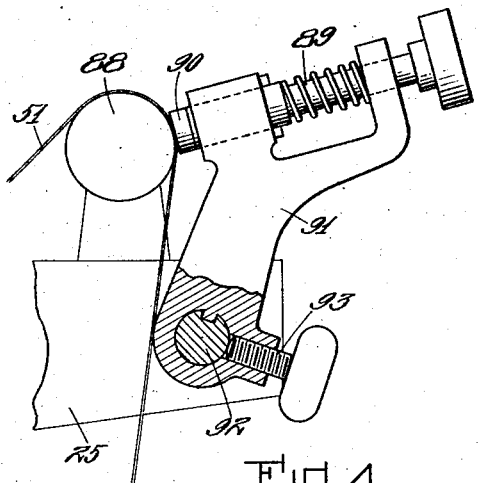
Fig. 4 is an enlarged side elevation, partly broken away, of the parts shown in Fig. 2.
Figure 6:
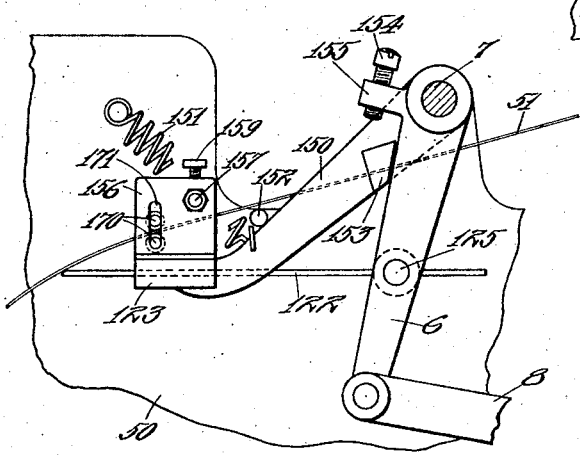
Fig. 6 is a side elevation of the parts shown in Fig. 5.

Except as hereinafter described, the machine herein shown, as to its general organization may, if desired, be substantially as more fully disclosed in the patent to Gipe above referred to. Generally speaking said machine comprises a main frame 25 provided with longitudinal ways in which is slidably mounted a carriage 27 carrying a work support 28 for supporting the boxes to be covered. Said carriage is reciprocated in its ways by mechanism which may be substantially similar to that shown in the Gipe patent above referred to, but which as herein shown is of the type disclosed in another application filed October 1, 1923, Serial No. 665,789.

For the purpose of the present case, this mechanism may be described as follows: The carriage 27 is formed at its underside with a lug 30 connected by links 31 with levers 32 suitably fulcrumed, as at 33, to the frame 25. Disposed between the levers 32 is a lever 34 fulcrumed at 35 to a bracket 36 secured to said frame. The levers 32 and 34 are formed with longitudinal slots to receive slides 37 pivotally connected, as at 38, with each other, and longitudinally adjustable in said slots, by mechanism generally indicated at 39, to adjust the operative connection of the levers 32 and 34 and thereby vary the length of the stroke of the carriage 27. The lever 34 is operated by a link 40 having a cam roller 41 which cooperates with a cam 42 on a cam shaft 43 journalled in the frame 25, said link having a forked end embracing said shaft, whereby said link is supported. The cam shaft 43 is connected by gearing 45 with a main shaft 46 suitably journalled in the machine frame and adapted to receive power from any suitable source through a belt pulley 47 thereon.

Supported above the path of movement of the carriage 27 and the work support 28, in an auxiliary frame 50 mounted on the main frame 25, are the devices for applying the covering material, which is supplied, as hereinafter more fully described, in the form of a continuous web 51 of paper or the like. The covering applying devices comprise a roller 52 for applying the free end of the web 51 to the box and a pressing roller 53 adapted, as the carriage moves outwardly, drawing the web with it, to descend upon the box and press said web down upon the same. When the carriage has moved outwardly far enough to draw off a sufficient quantity of covering material to cover the box, said material is severed from the web by a movable cutter 54 which is operated by means hereinafter described and which cooperates with a fixed cutter 55 on the auxiliary frame 50.

The mechanism for operating the rollers 52 and 53 may, if desired, be substantially similar to the corresponding part in said Gipe patent. As herein shown, however, said parts are of the construction and arrangement disclosed and claimed in another application filed October 1, 1923, Serial No. 665,788, and for the purpose of the present case may be described as follows: The applying roller 52 is carried by a pair of arms 56 loosely mounted on a transverse rod 57 supported in the auxiliary frame 50. The arms 56 are connected by links 58 with arms 59 on a rock shaft 60 journalled in the frame 25. One of said arms 59 forms part of a bell crank, the other arm 61 of which is provided with a cam roller 62 cooperating with a cam 63 on the cam shaft 43. The pressing roller 53 is carried by a pair of arms 68 also loosely mounted on the rod 57 and connected by links 69 with arms 70 on a rock shaft 71 journalled in the frame 25 and provided with an arm 72 to which is connected a link 73 supported by a link 74 from a rock shaft 75 journalled in said frame. The link 73 carries a cam roller 76 cooperating with a cam 77 on the shaft 43.

The web 51 of covering material is supplied from a roll 80 rotatably supported in hangers 81 preferably formed integral with and depending from the top of the frame 25 adjacent the rear end of the latter. Said material is periodically drawn from the roll 80, in order to provide sufficient slack therein for the proper operation of the machine, by means of a pull-off device comprising a roller 82 carried by arms 83 on a rock shaft 84 journalled in the frame 25. For the purpose of oscillating the rock shaft to swing the arms 83 and roller 82 downwardly and forwardly, or to the left in Fig. 1, to cause the same to draw the material from the roll, the rock shaft 84 is provided with an arm 85 connected by a link 86 with a crank 87 on the cam shaft 43.

The web 51 after being drawn from the roll by the pull-off roller 82, passes over a guide roller 88 journalled in a suitable support at the rear end of the frame 25. During its passage over the roller 88, said web is engaged by a transverse series of spring pressed plungers 89 which are preferably fitted at their ends with rubber pads 90 for engaging the paper. The plungers 89 are carried by arms 91 on a transverse rock shaft 92 journalled in the rear end of the frame 25. The arms 91 are independently adjustable longitudinally of the rock shaft 92 in order that they may be arranged to engage webs of different widths in the desired manner, said arms being secured in adjusted position on said rock shaft by means of set screws 93. The rock shaft 92 is provided with an arm 94 which is connected by a link 95 with one arm 96 of a bell crank fulcrumed at 97 on the frame 25 and the other arm 98 of which is provided with a cam roller 99 cooperating with a cam 100 on the shaft 43. The relative arrangement of the cam 100 and crank 87 are such that when the pull-off roller 82 is actuated to draw the web from the supply, the plungers 89 will be caused to press upon the web with their maximum force, thereby holding said web for the pull-off action of the roller 82, but when said roller 82 is returned to normal position during the operation of applying the covering to the box by the mechanism heretofore described, the shaft 92 is rocked to relieve the pressure of said plungers on the web to a predetermined extent.

From the roller 88 the web 51 passes over a second guide roller 101 and thence between edge-guides 102 on a rod 103 supported by uprights 104 from the frame 25, said edge-guides 102 being longitudinally adjustable on said rod laterally of the machine, and being secured in adjusted position thereon by set screws 105.

From the guides 102 the web passes over guide rollers 106 and 107 to the mechanism for applying adhesive to one surface thereof. Said mechanism is substantially similar in general arrangement and function to that described in the patent to Gipe above referred to and comprises a tank 108 for holding the adhesive in liquid form and a roller 109 journalled in the walls of said tank, dipping into the adhesive therein, and over which the web 51 passes. From the roller 109 said web passes over a guide roller 110 and thence over a transversely arranged scraper 111 by which the superfluous adhesive is removed therefrom.

Between the guide roller 107 and adhesive applying roller 109, the web preferably passes between a second pair of edge-guides 2 and thence through a device for applying a light tension thereto. Said tension applying device comprises a pair of uprights 3 located respectively at opposite sides of the tank 108 and having at their upper ends open slots in which are loosely received a pair of rollers 4 and 5 between which the web 51 passes. The upper roller 5 is engaged at its ends by leaf springs 116 secured to the tops of uprights 3, whereby said roller is pressed against the web and its free rotation yieldingly retarded, so as to resist the free movement of the web and apply the desired tension thereto.

From the adhesive applying devices the web 51 passes over a suitable number of guiding and supporting rollers 117 and 118.

The rollers 117 are carried by upright arms on a longitudinal rod 119 upon which the adhesive tank 108 is also preferably supported, said rod 119 being mounted in uprights 120 on the frame 25. The roller 118 is supported by an arm 121 on the rod 57.

The extreme end of the web 51 is supported between successive applying operations by a series of needles 122 which correspond in general arrangement, location and function to the needles more fully described in the patent to Gipe above referred to. Said needles are longitudinally reciprocated to project their ends beneath the end of the web to support the latter and are periodically retracted to release said end when the latter is applied to the box by the roller 52. The needles 122 pass through and are reciprocated in a lubricant box 123 which is preferably packed with waste or similar material 124. In accordance with the present invention, the needles 122 are secured at their rear ends in a rod 125 which is journalled at its ends in a pair of arms 6 on a transverse rod 7 supported at its ends in the auxiliary frame 50. The free ends of the arms 6 are connected by links 8 with arms 129 on a rock shaft 130 journalled in the auxiliary frame 50 and having an arm 131 connected by a link 132 with one arm 133 of a bell crank fulcrumed on the rock shaft 75 and connected with the frame 25 by a spring 134. The other arm 135 of said bell crank carries a cam roller 136 which cooperates with a cam 137 on the cam shaft 43.

The lubricant box 123 is carried by arms 150 loose on the rod 7 and supported by springs 151 connecting the same with the auxiliary frame 50, the normal position of said arms being determined by stops 152 on said frame. Said arms 150 are formed with laterally offset lugs 153 in the path of movement of abutment screws 154 in threaded engagement with lugs 155 on the arms 6. The screws 154 and lugs 153 provide an adjustable lost motion connection between the arms 6 and 150, whereby, when the arms 6 have been moved to a sufficient extent to withdraw the needles 122 into the lubricant box 123, the latter will be depressed toward the work support so as to assist the roller 52 in applying the end of the web to the work.

The lubricant box 123 is provided adjacent its ends with uprights 156 which support a transverse rod 157 on which are mounted a pair of edge-guides 158 for the web. The edge-guides 158 are adjustable on the rod 157 transversely of the machine and are held in adjusted position by the set screws 159.

After the end of the web 51 has been applied to the box the portion of said web so applied is severed from the body of the web by the movable cutter 54 operating in conjunction with the fixed cutter 55. Said movable cutter 54 is carried by a bail 9 on a rock shaft 10 journalled in the auxiliary frame 50, one side of said bail being extended beyond the rock shaft to form an arm 11 which is connected by a link 163, with an arm 164 on the rock shaft 75, said rock shaft 75 having a second arm 165 provided with a cam roller 166 cooperating with a cam 167 on the shaft 43.

After the web has been cut, the free end thereof is held against accidental retrograde movement by means of a pair of rollers 170 between which said web passes, the upper of said rollers resting by gravity on said web so as to grip the same with sufficient force for this purpose. Said rollers 170 are loosely mounted in vertical slots 171 and 172 in the uprights 156 and edge-guides 158 respectively, whereby said edge-guides may be adjusted as above described without interfering with the normal operation of said rollers.

Having thus described my invention, I claim:

1. In a box covering machine, the combination with means for applying covering material from a continuous web, of means for severing the applied material from the web comprising a fixed cutter, a movable cutter cooperating therewith, a rock shaft, a bail on said rock shaft by which said movable cutter is carried, an arm on said rock shaft, a cam, a cam lever cooperating therewith, and a link connecting said lever with said arm.

2. In a box covering machine, the combination with means for applying covering material from a continuous web, of means for supporting the end of said web comprising a plurality of needles, a rod to which said needles are secured, a pair of swinging arms in which the ends of said rod are journalled, and a pair of links for swinging said arms.

3. In a box covering machine, the combination with means for applying covering material from a continuous web, of means for supporting the end of said web comprising a plurality of needles, a lubricant box through which said needles pass, means for reciprocating said needles in said box, and means operated by said reciprocating means for raising and lowering said box.

4. In a box covering machine, the combination with means for applying covering material from a continuous web, of means for supporting the end of said web comprising a plurality of needles, a lubricant box through which said needles pass, a pair of swinging arms for reciprocating said needles in said box, and a pair of arms for supporting said box, said last named arms having a lost motion connection with said first named arms.

5. In a box covering machine, the combination of means for applying a covering material from a continuous web, means for severing the applied material from the web, and means continuously engaging the web with uniform pressure and supported in position to resist retrograde movement of the cut end of the web.

6. In a box covering machine, the combination of means for applying a covering material from a continuous web, means for severing the applied material from the web, and a gravity roller engaging the web and effective to resist retrograde movement of the cut end of the web.

7. In a box covering machine, the combination with a work support and means for applying to a box on said work support covering material from a continuous web, of means for severing the applied material from the web, a plurality of needles for supporting the end of said web, a lubricant box through which said needles pass, and means carried by said box for holding the end of said web against retrograde movement.

8. In a box covering machine, the combination with a work support and means for applying to a box on said work support covering material from a continuous web, of means for severing the applied material from the web, a plurality of needles for supporting the end of said web, a lubricant box through which said needles pass, means for moving said box toward and from said work support, and means carried by said box for holding the end of said web against retrograde movement.

9. In a box covering machine, the combination with a work support and means for applying to a box on said work support covering material from a continuous web, of means for severing the applied material from the web, a plurality of needles for supporting the end of said web, a lubricant box through which said needles pass, means for reciprocating said needles in said box, means operated by said reciprocating means for moving said box toward and from said work support, and means carried by said box for holding the end of said web against retrograde movement.

10. In a box covering machine, the combination with a work support and means for applying to a box on said work support covering material from a continuous web, of means for severing the applied material from the web, a pair of guides for the edges of said web, and a pair of rollers carried by said guides and between which said web passes, one of said rollers resting by gravity on said web.

11. In a box covering machine, the combination with a work support and means for applying to a box on said work support covering material from a continuous web, of means for severing the applied material from the web, a plurality of needles for supporting the end of said web, a lubricant box through which said needles pass, a pair of edge-guides for the web carried by said box, and means including a pair of rollers carried by said guides for holding the end of said web against retrograde movement.

12. In a box covering machine, the combination with a work support and means for applying to a box on said work support covering material from a continuous web, of means for severing the applied material from the web, a pair of guides for the edges of said web, means for supporting said guides and upon which the same are adjustable transversely of the web, and a pair of rollers carried by said guides and between which said web passes, one of said rollers resting by gravity on said web.

13. In a box covering machine, the combination with a work support and means for applying to a box on said work support covering material from a continuous web, of means for severing the applied material from the web, a pair of guides for the edges of said web, transverse rods on which said guides are adjustably supported, said guides having vertical slots, and a pair of transversely disposed rollers loosely received in said slots.

14. In a box covering machine, the combination of means for applying a web of material to the box, edge guides for said web, and roller means carried by said guides for exerting pressure on the web.

15. In a box covering machine, in combination, a work support, means for supplying a continuous web of covering material, devices for applying the end of said web to a box on said work support, means for reciprocating said work support relative to said applying devices to draw said web from the supply and cause the end portion thereof to be pressed upon the box, an adhesive tank, means associated with said tank and over which the web passes for applying adhesive to said web, a pair of uprights on the sides of said tank and provided with vertical slots, a pair of rollers in said slots between which the web passes, and a spring for pressing said rollers together.

16. In a box covering machine, in combination, a work support, means for supplying a continuous web of covering material, means for applying the end of said web to a box on said work support, and a plurality of spring pressed plungers engaging said web between the supply and said applying means.

17. In a box covering machine, in combination, a work support, means for supplying a continuous web of covering material, means for applying the end of said web to a box on said work support, a plurality of spring pressed plungers engaging said web between the supply and said applying means and means for simultaneously releasing the pressure of all of said plungers in the web.

18. In a box covering machine, in combination, a work support, means for supplying a continuous web of covering material, means for applying the end of said web to a box on said work support, a plurality of spring pressed plungers engaging said web between the supply and said applying means, means located between said supply and plungers for drawing the web from said supply, and means for simultaneously releasing the pressure of all of said plungers on the web.

19. In a box covering machine, in combination, a work support, means for supplying a continuous web of covering material, means for applying the end of said web to a box on said work support, a plurality of spring pressed plungers engaging said web between the supply and said applying means, and means whereby said plungers may be independently adjusted.

20. In a box covering machine, in combination, a work support, means for supplying a continuous web of covering material, means for applying the end of said web to a box on said work support, a plurality of spring pressed plungers engaging said web between the supply and said applying means, means whereby said plungers may be independently adjusted, and means for simultaneously releasing the pressure of all of said plungers on the web.

21. In a box covering machine, in combination, a work support, means for supplying a continuous web of covering material, means for applying the end of said web to a box on said work support, a roller over which said web passes, a shaft parallel to said roller, a plurality of arms longitudinally adjustable on said shaft, spring pressed plungers carried by said arms respectively and adapted to press said web against said roller, means for oscillating said shaft, and means located between said plungers and the supply for drawing the web from the latter.

22. In a box covering machine, the combination of means for applying a web of material to a box, edge guides for said web, roller means carried by guides for exerting pressure on the web, and means for permitting adjustment of said edge guides relatively to said roller means.

In testimony whereof I affix my signature.

GEORGE EDWARD GOODING.